United States Patent [19]
Johnson

[11] 3,737,154
[45] June 5, 1973

[54] SHOCK ATTENUATING DEVICE

[76] Inventor: Kenneth W. Johnson, 4113 Lakeshore Drive, Route 1, Jamestown, Ohio 45335

[22] Filed: July 12, 1971

[21] Appl. No.: 161,619

[52] U.S. Cl. ..................267/153, 267/181
[51] Int. Cl. ..................................F16f 1/40
[58] Field of Search..................267/152, 153, 181

[56] References Cited

UNITED STATES PATENTS

| | | | |
|---|---|---|---|
| 3,339,911 | 9/1967 | Strom | 267/153 |
| 3,610,610 | 10/1971 | Chassagne | 267/152 |
| 3,331,600 | 7/1967 | Goetz | et al./267 |

FOREIGN PATENTS OR APPLICATIONS

| | | | |
|---|---|---|---|
| 165,705 | 4/1950 | Germany | 267/181 |

*Primary Examiner*—James B. Marbert
*Attorney*—Irvin V. Gleim, Edward M. Tritle and Francis M. Crawford

[57] ABSTRACT

A shock attenuating device having an elastomeric member which is disposed within an opening formed between interconnected linkage members and is compressed by the linkage members upon relative movement therebetween. If desired, the device may also include friction damping means and/or viscous damping means.

5 Claims, 11 Drawing Figures

PATENTED JUN 5 1973 3,737,154

INVENTOR.
KENNETH W. JOHNSON

PATENTED JUN 5 1973
3,737,154
SHEET 3 OF 6
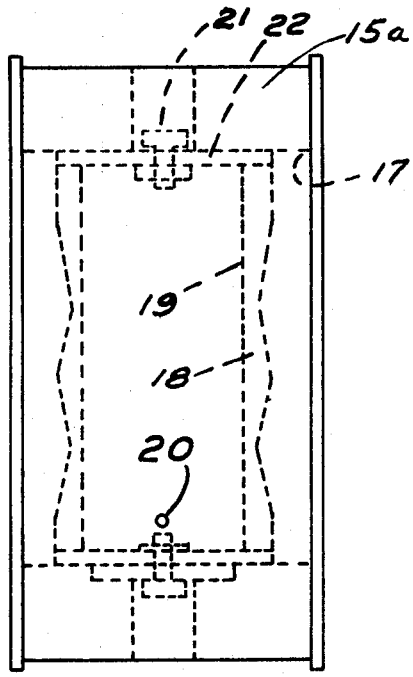
Fig. 5
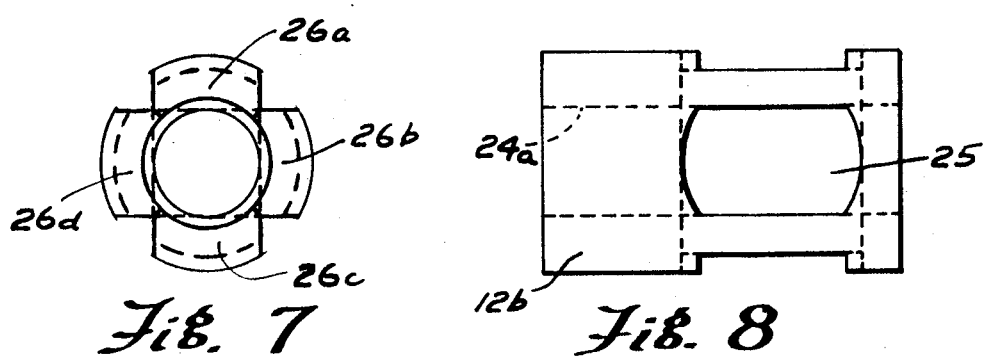
Fig. 7
Fig. 8
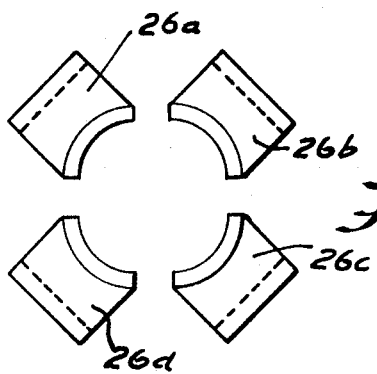
Fig. 9
INVENTOR.
KENNETH W. JOHNSON
BY
Attorneys

SHOCK ATTENUATING DEVICE

BACKGROUND

Shock attenuating devices known by various names such as shock absorbers, isolators, dampers, or a similar term have been employed to alleviate the effects of shock or impact on a mechanical device or system. In general, such devices receive and store in a resilient medium the energy involved in shock or impact, and thereafter the stored energy is released at a slower rate.

It is well-known that a moving body tends to remain in motion, and that a negative acceleration or deceleration must be applied thereto in order to reduce the speed of the moving body or to stop its motion.

A maximum value of such negative acceleration or deceleration is necessarily prescribed as a limit in order to prevent destructive damage to the body and/or to prevent injury to occupants of the moving vehicle. Accordingly, it can be shown that the distance traveled by the moving body from the time of impact until it is brought to rest is proportional to the square of its velocity at the time that impact occurs. Thus, if the initial velocity is doubled, the corresponding stopping distance is multiplied by 4; and if the velocity is multiplied by ten the corresponding required stopping distance increases 100 times.

Accordingly, a principal object of the present invention is to provide and improve a shock attenuating device which will limit deceleration values within safe limits to avoid injury to occupants of a vehicle and/or prevent destruction thereof within reasonable stopping distances commensurate with the type of moving body that may be involved. Accordingly, the devices embodying the present invention find particular utility as shock attenuating devices for use and applications such as car bumpers, vehicle seats and springs, safety belts, door closers, ski ropes, elevator safety mounts, parachute skid mounts, landing gear supports for aircraft, and protective devices for shipping containers and the like.

SUMMARY

These and other objects and advantages are obtained in accordance with the present invention in which an elastomeric member is disposed within openings or within the space between individual linkage members in a linkage which functions to compress the elastomeric member when relative movement occurs between the individual linkage members. If desired, frictional damping means and/or viscous damping means may be combined with the foregoing elements of the invention.

DESCRIPTION

The foregoing and other objects and advantages of the invention will become apparent from the following description taken in connection with the accompanying drawings in which:

FIG. 5 is an elevational view of the embodiment of FIG. 4;

FIGS. 7–9 illustrate various details of the friction damping means portion of the embodiment of FIG. 6;

Figure 1:
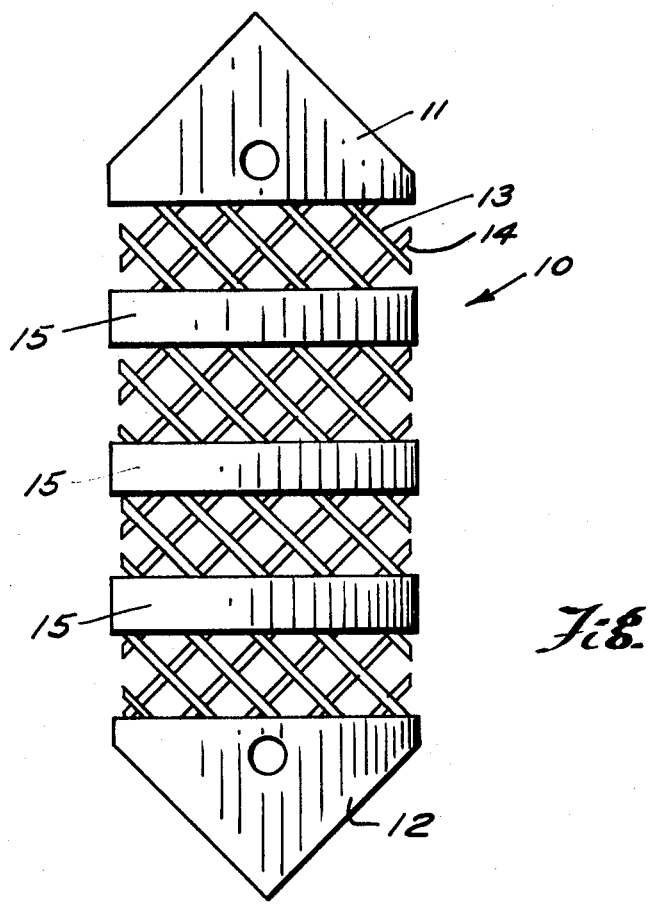
FIG. 1 is a shock attenuating device embodying the present invention.

In FIG. 1 a shock attenuating device embodying the present invention is indicated generally at 10 in the form of a belt-like or strap-like member. The device comprises a linkage member having opposed terminal portions 11, 12 with interwoven wires 13, 14 therebetween and connected to each of the terminal members. Individual wires 13 are spaced apart and individual wires 14 are similarly spaced apart so that the interwoven wires 13 and 14 define openings therebetween as shown in FIG. 1.

One or more elastomeric members 15 extend through said openings and project upwardly beyond opposite sides of the interwoven wires 13 and 14.

When the device 10 is subjected to tensile forces tending to cause relative separating movement between terminal portions 11, 12, the shape of the openings between individual wires 13, 14 tends to take change from a relatively square opening as shown in FIG. 1 to an opening which is somewhat elongated in the vertical direction and somewhat foreshortened in the horizontal direction. Similarly, if terminal portions 11,12 are subjected to forces in the opposite direction tending to move said terminal portions relatively together, the openings between individual wire portions 13, 14 will be similarly deformed except that in this case the elongation is in the horizontal direction and the foreshortening is in the vertical direction. Thus, when the device is subjected either to a compressive or a tensile load, the elastomeric material of member 15 which extends through the openings is subjected to compression regardless of the direction of the application of the load to the device 10. The resiliency of the elastomeric material allows it to be deformed readily and its resiliency causes it to return to its initial condition when the load is removed. Upon sudden application of load in either direction, the elastomeric member 15 functions like a rubber-like spring to store the shock energy, and the resilience of the elastomeric member allows such energy to be released at a desired rate as the load is removed. Additionally, the interweaving of individual wires 13, 14 provides frictional damping through rubbing engagement of the interwoven wires when the device is subjected either to a compressive or tensile type of load.

Figure 2:
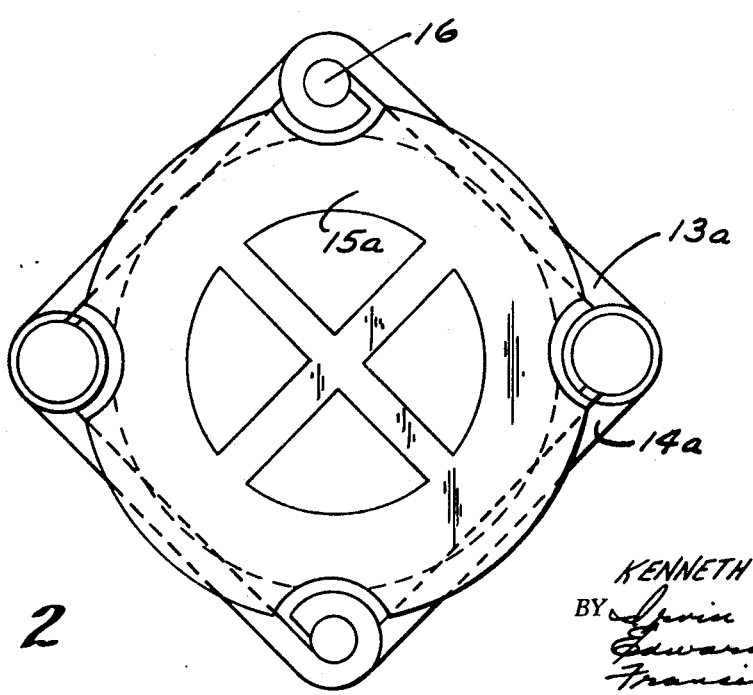
FIG. 2 is a view illustrating another embodiment of the invention.
Figure 3:
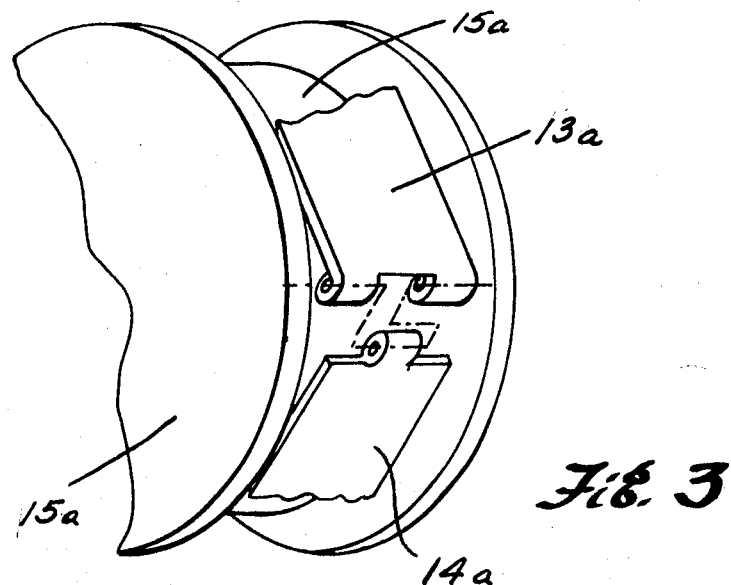
FIG. 3 is a perspective view, partly broken, illustrating the manner of assembly of various elements of the embodiment of FIG. 2.

The embodiment illustrated in FIGS. 2 and 3 is in fact representative of one opening formed by wires 13 and 14. The terminal portions 11, 12 are not shown and the interwoven wires 13, 14 are replaced by relatively flat linkage members 13a, 14a, which are pivotally connected together at their respective end portions by pins 16. Additionally, the elastomeric member 15 is modified to a spool-like shape as is best shown in FIG. 3. Linkage members 13a, 14a are disposed between opposite ends of the spool-like member 15a.

As is best shown in FIG. 2, the opening formed between adjacent individual members 13a, 14a, is initially essentially square shaped. The shape of this opening is altered similar to that described in connection with FIG. 1 when the linkage members are subjected either to a compressive or tensile type of load thus causing elastomeric member 15a to be subjected to compression. Similarly, frictional damping is provided by the relative frictional engagement between members 13a, 14a and by pins, bolts and the like which are inserted in opening 16 when the device is subjected to load in a manner similar to that described in connection with FIG. 1.

Figure 4:
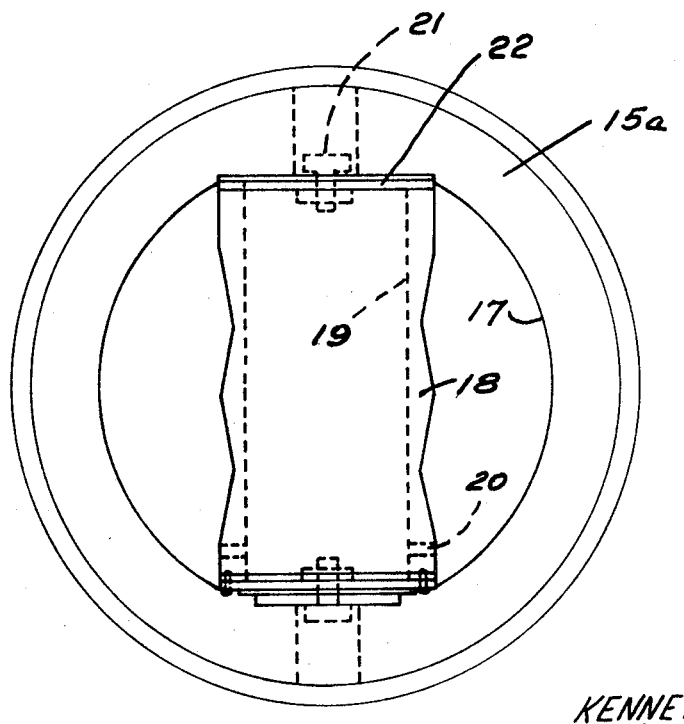
FIG. 4 is a view similar to that of FIG. 2 illustrating still a further embodiment of the invention.

In FIGS. 4–5, the elastomeric member 15a is provided with a central opening 17 within which is mounted a separately-molded elastomeric member in the form of a cylinder 18 provided with a central bore 19. Cylinder 18 is mounted within the central opening 17 and secured therein by any convenient means, as for example, by threaded fasteners 21 and end portions 22. Thus, cylinder 18 is enclosed and communication is established between its central bore 19 and ambient atmosphere by an orifice 20. The hollow cylinder thus defines a particular volume in the undeformed condition, the volume of which changes when the elastomeric member 15a is compressed. The size of the orifice 20 provides a restricted opening for the inward or outward flow of air during such volume changes thus providing viscous-type damping means for the device.

Figure 6:
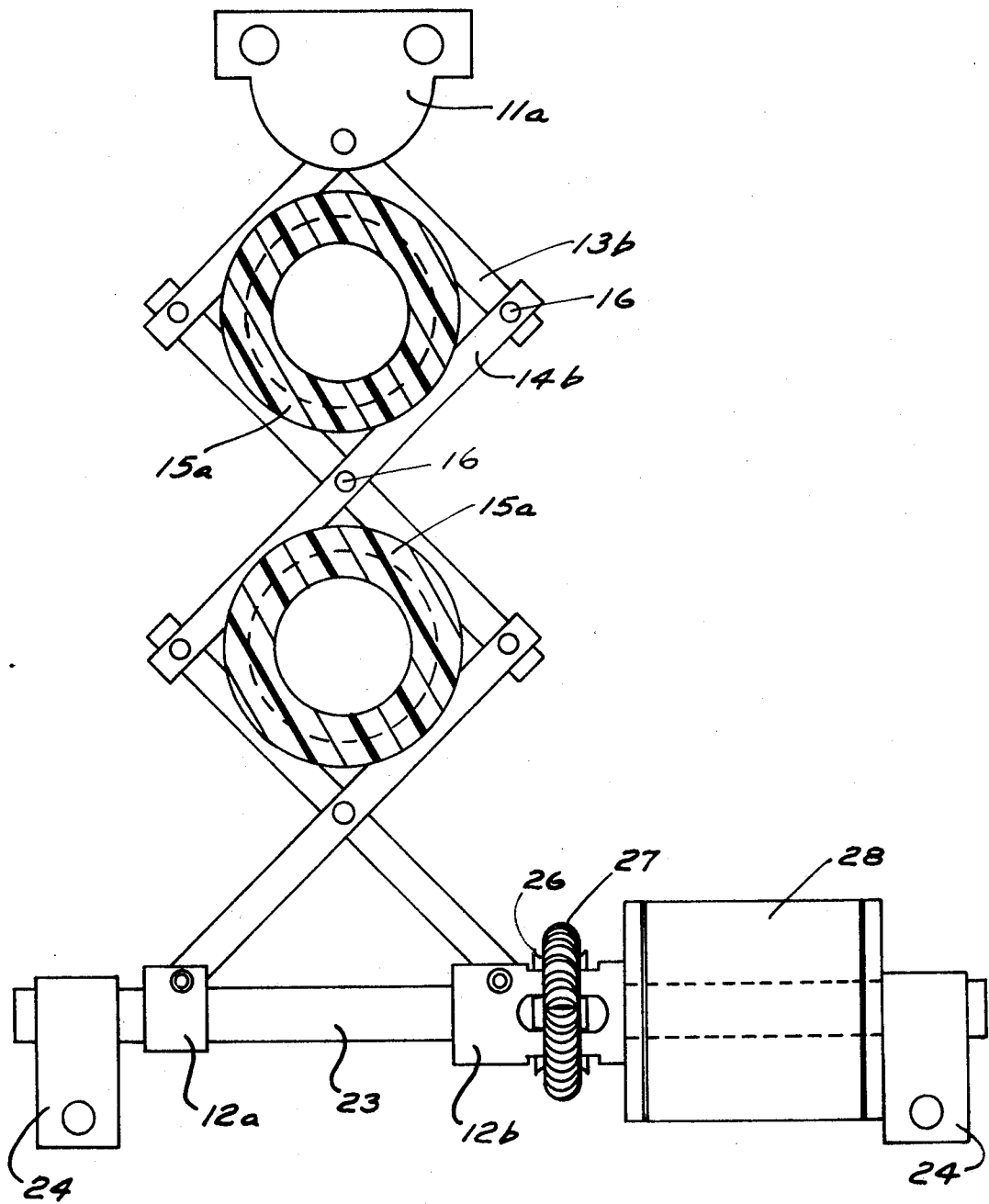
FIG. 6 is a view illustrating a still further embodiment of the invention.

A still further modification of the invention is illustrated in FIG. 6 wherein a movable terminal portion 11a is connected to a linkage comprising linkage 13b, 14b pivotally connected by pins 16 and having a terminal portion 12a fixed to a rod 23 which is in turn fixed to support brackets 24. Terminal member 12b is mounted for reciprocation on rod 23 in a manner to be described presently. Elastomeric members 15a are mounted in the openings formed between adjacent linkage members 13b and 14b as before and are subjected to compression when terminal member 11a is moved relative to member 12a either in an upward or in a downward direction.

Terminal portion of 12b is provided with a central bore 24a extending therethrough. The diameter of bore portion 24a is somewhat greater than the outside diameter of rod 23, so that member 12b will move freely relative to the rod. Additionally member 12b is provided with slotted openings 25 at its right-hand end as is best shown in FIG. 8 to accommodate a friction member 26 which is maintained in frictional engagement with rod 23 by a spring 27. As shown in FIG. 8, member 12b includes a central bore 24a which is somewhat greater in diameter than the outside diameter rod 23 so that member 12b will move freely relative to the rod. At the right-hand side of member 12b there are provided a plurality of slotted portions 25 through which the individual segment portions of frictional member 26 extend.

If desired, an additional elastomeric member 28 may also be mounted on rod 23 and disposed between movable member 12b and the right hand upstanding bracket 24.

As shown in FIG. 6, the device is in its normal extended position. When an impact load is applied to terminal member 11a in a downward direction, the linkage becomes foreshortened and the shape of the opening defined by adjacent members 13b and 14b is altered thereby compressing elastomeric members 15a. During the foreshortening movement of the linkage, slidable member 12b moves to the right and thereby introduces frictional damping into the device by the frictional rubbing engagement between member 26 and rod 23. As member 12b continues to move to the right elastic member 28 also becomes compressed.

The device functions essentially in the same way if the load is applied in the opposite direction tending to extend the linkage, except in this case. Member 12b tends to move to the left thus subjecting members 15a to compression and introducing frictional damping by frictional rubbing engagement between member 26 and rod 23 but member 28 is relieved of any compression to which it may have been initially subjected and is not further compressed.

Figure 10:
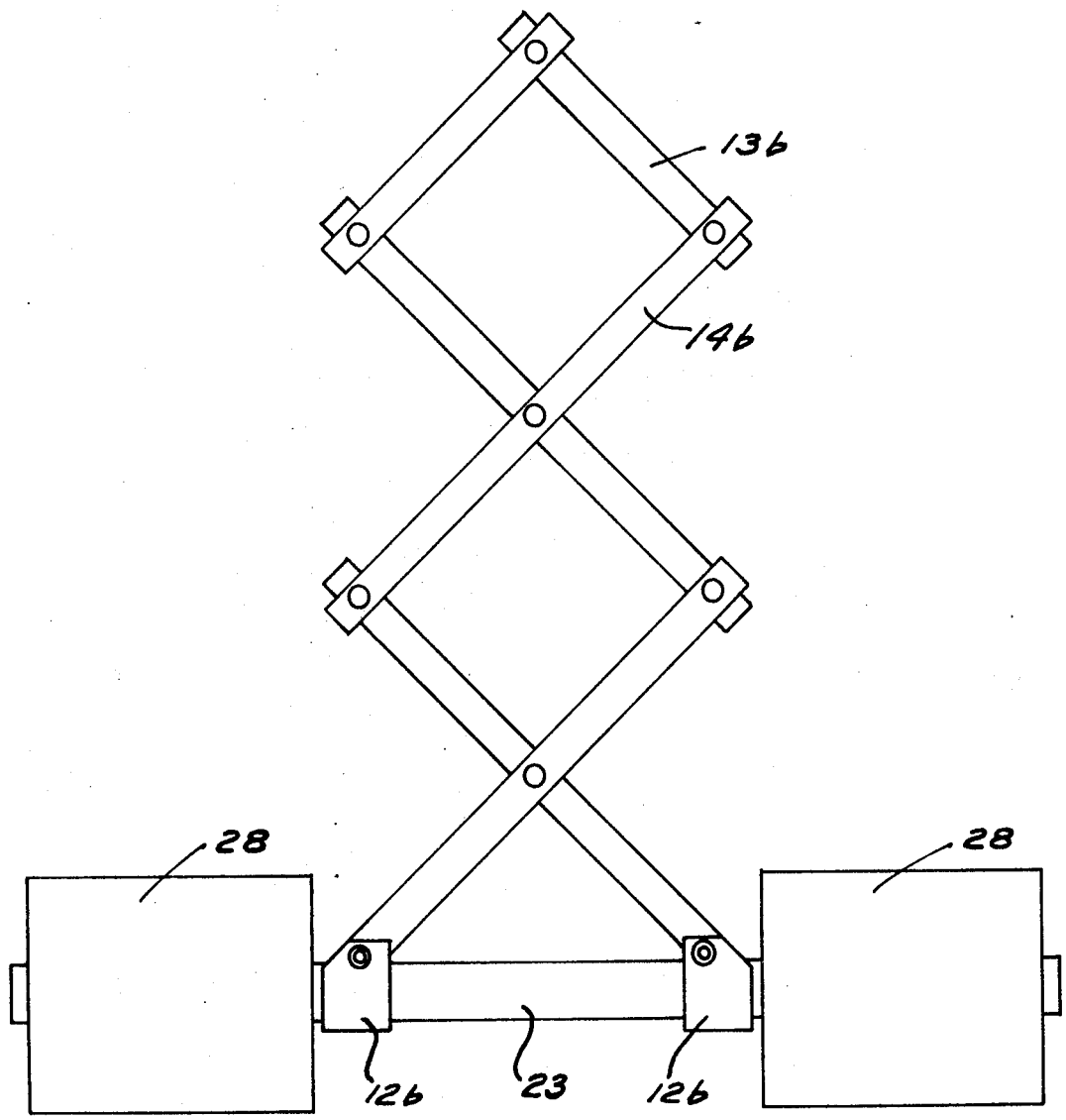
FIG. 10 is a view illustrating a modification of the embodiment of FIG. 6.

FIG. 10 is a modified embodiment that differs from FIG. 6 in that the fixed lower member 12a is omitted and is replaced by a member 12b also slidably mounted on rod 23, and an additional elastomeric member 28 is added. If desired, rod 23 with members 28 may be positioned intermediately at the linkage points of members 13b and 14b. In the interest of clarity the upper terminal member 11a, the elastomeric members 15a, the frictional member 26 and spring 27 are not shown in this view, but it is to be understood that this modification also includes at least upper terminal member 11a and the elastomeric members 15a. In operation, the device shown in FIG. 10 functions substantially identical with that of the embodiment of FIG. 6 except that both lower members 12b move in a horizontal direction when the linkage is either compressed or extended.

Figure 11:
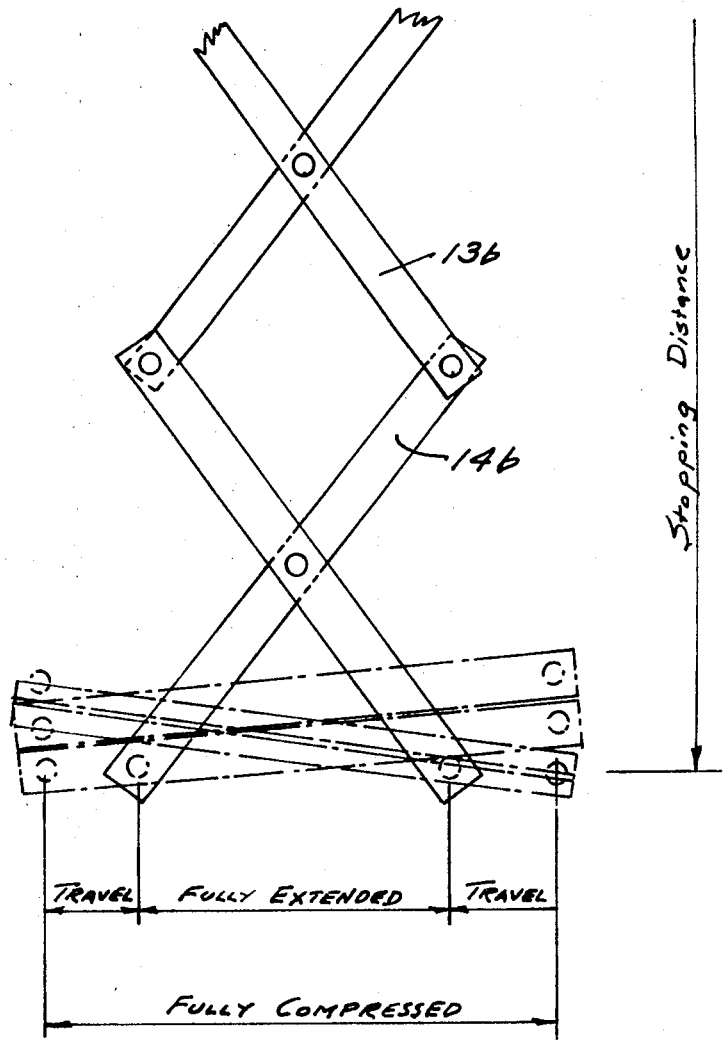
FIG. 11 is a view illustrating limiting positions of the linkage members of the embodiment of FIG. 10.

FIG. 11 is a view showing portions of the embodiment of FIG. 10. In the interest of clarity, all elements except linkage members 13b and 14b are omitted from FIG. 11 in order to show that only a relatively small amount of movement of the lower terminal portions of the linkage is required in a horizontal direction regardless of how long or short the linkage is extended in a vertical direction.

While particular embodiments of the invention have been illustrated and described, it will be obvious to those skilled in the art that various changes and modifications can be made without departing from the invention, and it is intended in the appended claims to cover all such changes and modifications that fall within the true spirit and scope of the invention.

What is claimed is:

1. Shock-attenuating device comprising spaced-apart load-receiving and load-supporting terminal portions, and
   means yieldably restricting relative movement between said terminal portions, said means including interconnected linkage members angularly disposed relative to one another and forming at least one opening between adjacent members, and
   an elastomeric body disposed in said opening and compressed by said adjacent members when said relative movement between said terminal portions occurs.

2. Device according to claim 1 wherein said elastomeric body is compressed when said relative movement occurs in either of opposite directions.

3. Device according to claim 1 wherein said interconnected linkage members include woven wires providing frictional damping when said relative movement occurs.

4. Device according to claim 1 wherein said body forms therein an opening, and additionally including viscous damping means in said opening.

5. Device according to claim 4 wherein said damping means includes an enclosed hollow cylindrical member, and orifice means disposed in the wall of said cylindrical member.

* * * * *